July 21, 1942.   T. SVET   2,290,258
LAWN SPRINKLER
Filed June 17, 1941
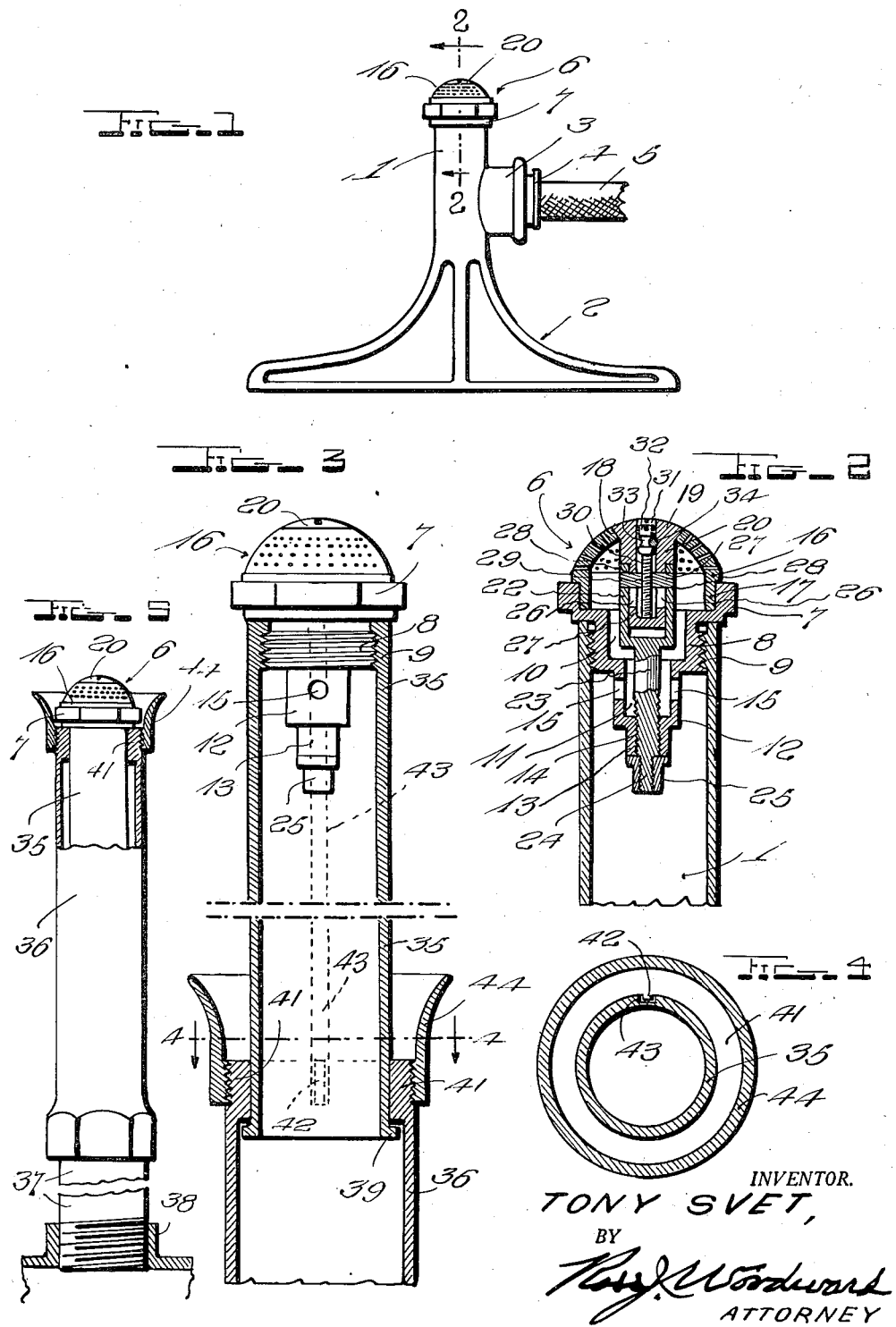
INVENTOR.
TONY SVET,
BY
ATTORNEY Patented July 21, 1942

2,290,258

UNITED STATES PATENT OFFICE 2,290,258

LAWN SPRINKLER

Tony Svet, Cleveland, Ohio

Application June 17, 1941, Serial No. 398,481

6 Claims. (Cl. 239—132)

This invention relates to a lawn sprinkler and one object thereof is to provide a sprinkler having an improved nozzle adapted for use in connection with a sprinkler to be applied to a hose or with a sprinkler of a system wherein a number of sprinklers are connected with an underground supply pipe.

Another object of the invention is to provide a sprinkler having a nozzle adapted to be mounted at the upper end of an upright pipe or tube through which water flows from a source of supply, the nozzle being detachably mounted in the upper end of the tube and having a distributor head so formed that a very good fountain will be formed when the sprinkler is in use and water discharged from the nozzle.

Another object of the invention is to provide the fountain head with securing means so constructed that the head may be firmly held in place but easily removed when necessary.

Another object of the invention is to permit the fountain head to be vertically adjusted when desired and also to permit removal of the head without disconnecting the nozzle from the tube carrying same.

Another object of the invention is to provide a sprinkler for use with an underground supply pipe wherein the nozzle is carried by a tube which telescopes into a companion tube and is adapted to be shifted upwardly by water pressure and project above a lawn when the valve controlling flow of water through the system is opened, the tube carrying the nozzle returning to its lower or retracted position when the flow of water is shut off.

Another object of the invention is to provide a lawn sprinkler which is simple in construction, efficient in operation, and easy to clean or repair when occasion arises.

The invention is illustrated in the accompanying drawing, wherein;

Fig. 1 is a side elevation of a lawn sprinkler of the improved construction.

Fig. 2 is a vertical sectional view on the line 2—2 of Fig. 1.

Fig. 3 is a view partially in vertical and partially in elevation, of a sprinkler of the improved construction adapted for use with an underground supply pipe.

Fig. 4 is a transverse sectional view on the line 4—4 of Fig. 3.

Fig. 5 is a view showing the nozzle-carrying tube of Fig. 3, in its lowered or retracted position.

The sprinkler shown in Fig. 1, has a tubular body 1 which is provided at its lower end with a support 2 for resting on the ground and holding the body or tube 1 in upright position. A socket 3 extends from a side of the tube and is internally threaded for engagement with the coupling 4 of a hose 5. It will thus be seen that the sprinkler illustrated in Fig. 1, is adapted for use with a garden hose and may be moved about a lawn from place to place during sprinkling of the lawn.

A nozzle 6 is mounted at the upper end of the tube and is of the construction shown in Fig. 2. Referring to this figure, it will be seen that the nozzle has a cup-shaped body or socket 7 having flat faces about its periphery so that its threaded shank 8 may be tightly screwed into the internally threaded upper end portion 9 of the tube 1. The shank 8 is hollow to provide a pocket 10 communicating with a smaller pocket 11 formed in a neck 12 which extends downwardly from the shank and this neck has a reduced extension 13 formed with an internally threaded bore 14. Openings 15 are formed through sides of the shank so that water in the tube 1 may flow through these openings into the pocket 11 and upwardly from said pocket into and through pocket 10.

The water flowing from the pocket 10 is to be sprayed upon the lawn and in order to do so, there has been provided a hollow spray head 16 which is dome-shaped and has a reduced lower portion 17 fitting snugly in the cup-shaped body or socket 7. At its center, the head is formed with a large downwardly tapered opening 18 to receive the flared crown 19 of a fastener 20. This fastener extends axially of the spray head and the socket 7 and is formed with a reduced inner or lower portion forming a shank 21 which fits snugly within the cup 22 formed integral with the upper end of a bolt 23. The bolt extends longitudinally through the pocket 11 in spaced relation to walls thereof and has its lower portion threaded through the bore 14 of the reduced extension 13 of the neck 12. The lower end of the bolt is reduced and threaded to form a stem 24 which projects downwardly from the neck 12 and to this stem is applied a nut 25 which, when tightened, abuts the lower end of the neck and securely holds the fastener in place.

Slots 26 are formed through walls of the shank 21, longitudinally thereof, and through these slots passes a block 27 which has ends mounted in openings 28 formed in walls of the cup 22. This block is formed with a threaded opening 29 to receive a screw 30 which extends longitudinally in the pocket 31 of the fastener 20 and has a head 32 adapted for engagement with a screw driver and exposed through the open upper end of the pocket so that the screw driver may be thrust downwardly into the pocket and engaged with the screw to turn the same. A groove 33 is formed about the head of the screw to receive a pin 34 mounted transversely through the fastener 20, which may be referred to as a shank for the sprinkler head 16, and when the screw is turned the sprinkler head will be shifted vertically and the extent of the spray discharged from the spray head controlled.

In the embodiment of the invention illustrated in Figs. 3, 4 and 5 of the drawing, the nozzle is of the same construction as shown in Figs. 1 and 2, and its elements are designated by the same reference numerals. This nozzle is screwed into a tube 35 corresponding to the tube or body 1 but mounted for vertical sliding movement in a pipe section or shell 36. The pipe section 36 has its lower end internally threaded for engagement with the upper end of a nipple 37 carried by a coupling 38 forming a portion of an underground sprinkler system. A flange 39 formed about the lower end of the tube 35 limits its upward movement through the sleeve 36 by engagement with the annular shoulder formed by the inwardly thickened portion 41 of the sleeve and, in order to prevent the tube from turning in the sleeve, there has been provided a lug or key 42 which projects from the thickened portion of the sleeve and engages in the groove 43 extending longitudinally of the tube and open at its upper end so that when the tube is thrust upwardly into place within the sleeve, the lug may engage in the groove. When the valve for the sprinkler system is opened and water flows through the system and into the sleeve 36, the tube 35 will be forced upwardly to raised position by pressure of water which flows upwardly through the sleeve and into the tube through the open lower end thereof and the water will be discharged in a spray from the spray head of the nozzle. When flow of water is shut off, the tube will be moved downwardly into the sleeve to retracted position where it will be shielded by the cuff or collar 44 consisting of a metal ring threaded onto the upper end of the sleeve and which flares upwardly therefrom so that the nozzle may be easily moved downwardly to the retracted position shown in Fig. 5 of the drawing.

Having thus described the invention, what is claimed is:

1. In a lawn sprinkler, a tube disposed vertically and adapted for connection with a source of supply, said tube being open at its upper end and having its upper end portion internally threaded, and a nozzle carried by said tube and comprising a hollow cup-shaped socket having a threaded shank screwed into the internally threaded upper portion of the tube, a hollow neck extending downwardly from said shank and having a reduced lower portion formed with a threaded bore, the shank and neck defining upper and lower pockets, the lower pocket having inlets formed through walls of the neck and communicating with the interior of the tube, a hollow spray head having a reduced lower portion fitting snugly within the cup-shaped socket, a shank for the spray head, a fastener extending vertically in the pockets and having a cup at its upper end slidably receiving the shank and a threaded lower portion engaged through the threaded bore of the neck of the socket, and means for adjusting the spray head shank in the cup of the fastener.

2. In a lawn sprinkler, a tube disposed vertically and adapted for connection with a source of supply, said tube being open at its upper end, a socket detachably carried by the upper end of the tube and having a lower inlet, a spray head carried by said socket, a fastener carried by the socket, the fastener being disposed vertically in the socket and provided with a cup at its upper end, a shank for the spray head having its lower portion engaged in the cup and shiftable vertically therein, said shank being formed with a longitudinally extending pocket and opposed side openings leading therefrom, a transversely extending block carried by the cup and passing through the side openings and the pocket of the shank, said block being formed with a threaded opening within the pocket, a screw extending vertically in the pocket and threaded through the opening of the block, said screw having a head formed with a circumferentially extending groove, and a pin passing transversely through the shank and pocket and engaged in the groove to hold the screw against longitudinal movement in the pocket and cause the shank and spray head to be shifted vertically when the screw is turned.

3. In a lawn sprinkler, a tube disposed vertically and adapted for connection with a source of supply, said tube being open at its upper end, a socket detachably carried by the upper end of the tube and having a lower inlet, a spray head carried by said socket, a fastener carried by the socket, the fastener being disposed vertically in the socket and provided with a cup at its upper end, a shank for the spray head having its lower portion engaged in the cup and shiftable vertically therein, and means for shifting the shank vertically in the cup and holding the shank in set position.

4. In a sprinkler, a perforated spray head, a cup-shaped socket having a depending shank for engagement with a conduit, a neck extending downwardly from said shank, the shank and neck being hollow to provide inter-communicating upper and lower pockets and the lower end of the neck having a threaded bore leading from the lower pocket, walls of the lower pocket being formed with inlet openings, a fastener for the spray head, a bolt having a cup at its upper end slidably receiving the fastener of the spray head, said bolt extending vertically in the pockets and having its lower portion threaded through the bore of the neck of said socket, the fastener of the spray head having a longitudinal pocket formed with side openings, a block carried by the cup and passing transversely through the side openings in the fastener of the spray head, a screw in the pocket of the fastener threaded through the opening in the block and having a turning head at its upper end, and a pin extending transversely through the pocket of the fastener and engaging the screw to prevent longitudinal movement thereof in the fastener and cause the spray head to be shifted to adjusted positions when the screw is turned.

5. In a sprinkler, a perforated spray head, a cup-shaped socket having a depending shank for engagement with a conduit, a neck extending downwardly from said shank, the shank and neck being hollow and the neck having a water inlet, a fastener mounted vertically in the shank and having a cup at its upper end, a shank for said spray head slidably received in said cup and formed with a longitudinally extending pocket having diametrically opposed side openings, a block carried by said cup and extending transversely thereof through the side openings and the pocket of the shank of the spray head, the block being formed with a threaded opening within the pocket, a screw extending longitudinally in the pocket and threaded through the opening in the block, the screw being formed with a circumferentially extending groove, and a pin carried by the cup and engaged in the groove to prevent movement of the screw longitudinally in the pocket and cause the spray head to be shifted to adjusted positions when the screw is turned.

6. In a sprinkler, a perforated spray head, a cup-shaped socket having a depending shank for engagement with a conduit, a neck extending downwardly from said shank, the shank and neck being hollow and the neck having water inlets, a fastener mounted vertically in the shank and having a cup at its upper end, a shank for said spray head slidably received in said cup, and means for retaining the shank of the spray head in engagement with the cup and shifting the shank longitudinally to move the spray head to adjusted positions.

TONY SVET.